(12) United States Patent
Wright

(10) Patent No.: US 6,782,737 B2
(45) Date of Patent: Aug. 31, 2004

(54) SYSTEM FOR ESTIMATING PEAK CYLINDER PRESSURE IN AN INTERNAL COMBUSTION ENGINE

(75) Inventor: John F. Wright, Columbus, IN (US)

(73) Assignee: Cummins, Inc., Columbus, IN (US)

(*) Notice: Subject to any disclaimer, the term of this patent is extended or adjusted under 35 U.S.C. 154(b) by 0 days.

(21) Appl. No.: 10/118,419

(22) Filed: Apr. 8, 2002

(65) Prior Publication Data

US 2003/0188571 A1 Oct. 9, 2003

(51) Int. Cl.[7] ............................................. G01M 15/00
(52) U.S. Cl. .................................................... 73/115
(58) Field of Search ................ 73/116, 117.3, 73/115; 701/22; 123/406.22, 406.26, 295, 478, 299, 406.19, 559.1, 435, 676; 60/602

(56) References Cited

U.S. PATENT DOCUMENTS

| | | | |
|---|---|---|---|
| 5,024,191 A | 6/1991 | Nagahiro et al. | 123/198 D |
| 5,056,487 A | 10/1991 | Yamakado et al. | 123/436 |
| 5,067,460 A | 11/1991 | Van Duyne | 123/337 |
| 5,076,098 A | 12/1991 | Miwa | 73/115 |
| 5,168,854 A | 12/1992 | Hashimoto et al. | 123/425 |
| 5,276,625 A | 1/1994 | Nakaniwa | 364/431.08 |
| 5,284,114 A | 2/1994 | Fukui | 123/414 |
| 5,692,474 A * | 12/1997 | Yamauchi et al. | 123/425 |
| 5,712,424 A | 1/1998 | Reed | 73/115 |
| 5,786,531 A | 7/1998 | Lewis et al. | 73/116 |
| 5,865,153 A * | 2/1999 | Matsumoto | 123/299 |
| 6,272,426 B1 | 8/2001 | Tascillo | 701/106 |
| 6,330,510 B1 | 12/2001 | Takaku et al. | 701/114 |
| 6,332,446 B1 | 12/2001 | Matsumoto et al. | 123/198 F |
| 6,491,024 B1 * | 12/2002 | Connolly et al. | 123/406.19 |
| 6,508,242 B2 * | 1/2003 | Jaliwala et al. | 123/676 |
| 6,550,464 B1 * | 4/2003 | Brackney | 123/676 |
| 6,557,525 B2 * | 5/2003 | Ogawa et al. | 123/406.26 |
| 6,619,261 B1 * | 9/2003 | Wang et al. | 123/435 |

* cited by examiner

Primary Examiner—Edward Lefkowitz
Assistant Examiner—Octavia Davis
(74) Attorney, Agent, or Firm—Barnes & Thornburg

(57) ABSTRACT

A system for estimating peak cylinder pressure in an internal combustion engine includes a pressure sensor producing a pressure signal indicative of pressure within an intake manifold of the engine, a temperature sensor producing a temperature signal indicative of temperature within the intake manifold, means for determining a charge fuel ratio corresponding to a ratio of in-cylinder trapped charge mass and in-cylinder trapped fuel mass, and a control computer determining a start-of-injection value corresponding to a start of fuel injection into the engine. The control computer is operable to estimate peak cylinder pressure as a function of the pressure signal, the temperature signal, the charge fuel ratio and the start-of-injection value.

14 Claims, 3 Drawing Sheets

SYSTEM FOR ESTIMATING PEAK CYLINDER PRESSURE IN AN INTERNAL COMBUSTION ENGINE

FIELD OF THE INVENTION

The present invention relates generally to systems for determining peak cylinder pressure in an internal combustion engine, and more specifically to such systems for estimating peak cylinder pressure as a function of one or more engine operating conditions.

BACKGROUND AND SUMMARY OF THE INVENTION

When combustion occurs in an environment with excess oxygen, peak combustion temperatures increase which leads to the formation of unwanted emissions, such as oxides of nitrogen ($NO_x$). This problem is aggravated through the use of turbocharger machinery operable to increase the mass of fresh air flow, and hence increase the concentrations of oxygen and nitrogen present in the combustion chamber when temperatures are high during or after the combustion event.

One known technique for reducing unwanted emissions such as $NO_x$ involves introducing chemically inert gases into the fresh air flow stream for subsequent combustion. By thusly reducing the oxygen concentration of the resulting charge to be combusted, the fuel burns slower and peak combustion temperatures are accordingly reduced, thereby lowering the production of $NO_x$. In an internal combustion engine environment, such chemically inert gases are readily abundant in the form of exhaust gases, and one known method for achieving the foregoing result is through the use of a so-called Exhaust Gas Recirculation (EGR) system operable to controllably introduce (i.e., recirculate) exhaust gas from the exhaust manifold into the fresh air stream flowing to the intake manifold valve, for controllably introducing exhaust gas to the intake manifold. Through the use of an on-board microprocessor, control of the EGR valve is typically accomplished as a function of information supplied by a number of engine operational sensors.

While EGR systems of the foregoing type are generally effective in reducing unwanted emissions resulting from the combustion process, a penalty is paid thereby in the form of a resulting loss in engine efficiency and an increased concern that the engine is operating within safe operating limits. A tradeoff thus exists in typical engine control strategies between the level of $NO_x$ production and engine operating efficiency and safety, and difficulties associated with managing this tradeoff have been greatly exacerbated by the increasingly stringent requirements of government-mandated emission standards.

One of the concerns that is heightened through the use of recirculated exhaust gas is peak cylinder pressure. Because turbochargers in EGR engines typically operate at higher speeds in order to ensure positive exhaust gas flow from the exhaust manifold to the intake manifold, boost pressures tend also to be higher than in non-EGR engines. Additionally, intake manifold temperatures are typically higher in EGR engines due to the introduction of hot exhaust gas into the fresh air stream. Both of these conditions tend to increase the peak cylinder pressure, at it is accordingly desirable to at least monitor peak cylinder pressure in real-time.

The present invention provides a system for estimating engine peak cylinder pressure as a function of other engine operating conditions.

These and other objects of the present invention will become more apparent from the following description of the preferred embodiments.

DESCRIPTION OF THE PREFERRED EMBODIMENTS

Figure 1:
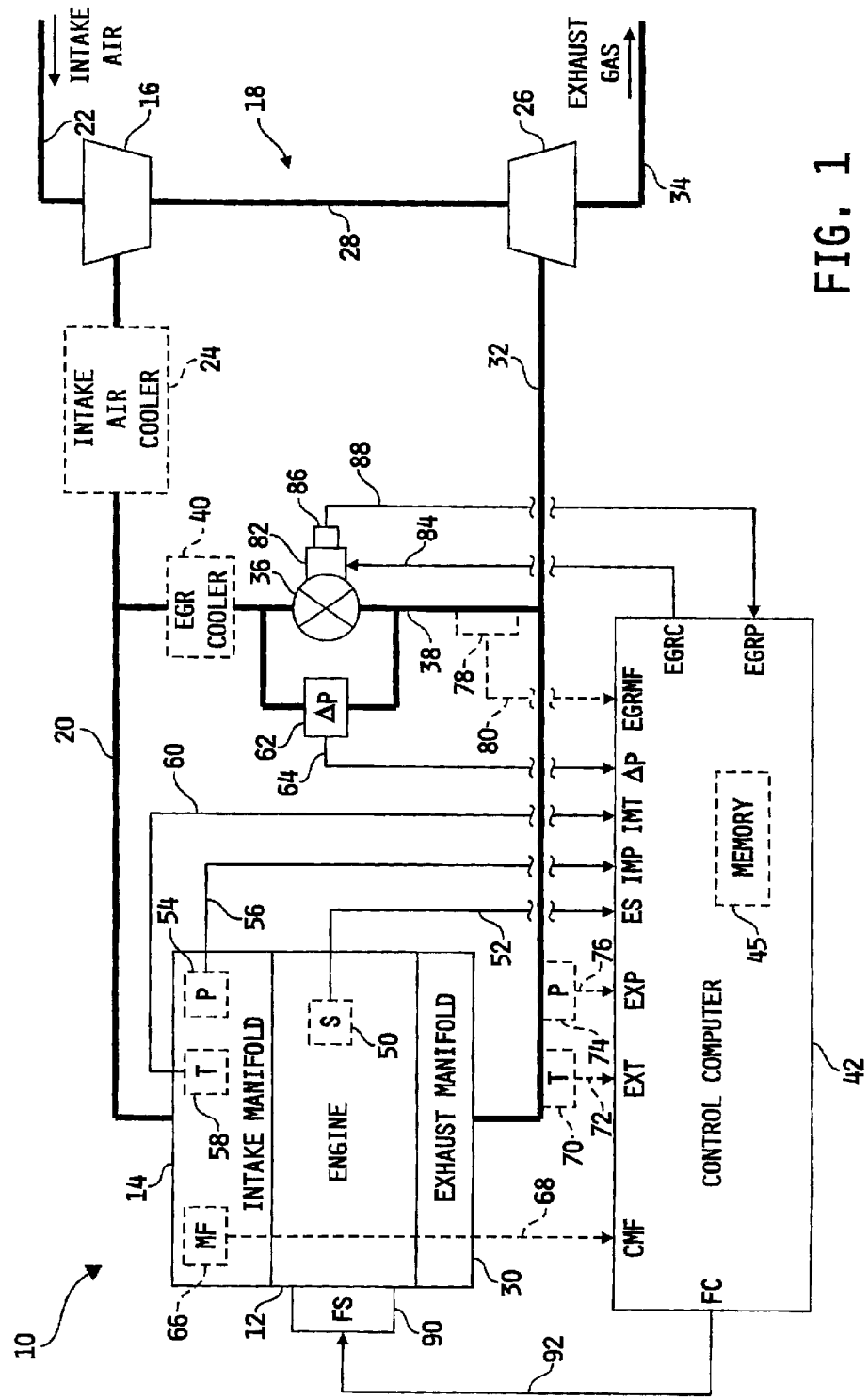
FIG. 1 is a diagrammatic illustration of one preferred embodiment of a system for estimating peak cylinder pressure in an internal combustion engine, in accordance with the present invention.

For the purposes of promoting an understanding of the principles of the invention, reference will now be made to a number of preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Referring now to FIG. 1, a diagrammatic illustration of one preferred embodiment of a system 10 for estimating peak cylinder pressure in an internal combustion engine, in accordance with the present invention, is shown. System 10 includes an internal combustion engine 12 having an intake manifold 14 fluidly coupled to an outlet of a compressor 16 of a turbocharger 18 via an intake conduit 20, wherein the compressor 16 includes a compressor inlet coupled to an intake conduit 22 for receiving fresh air therefrom. Optionally, as shown in phantom in FIG. 1, system 10 may include an intake air cooler 24 of known construction disposed in line with intake conduit 20 between the turbocharger compressor 16 and the intake manifold 14. The turbocharger compressor 16 is mechanically coupled to a turbocharger turbine 26 via a drive shaft 28, wherein turbine 26 includes a turbine inlet fluidly coupled to an exhaust manifold 30 of engine 12 via an exhaust conduit 32, and further includes a turbine outlet fluidly coupled to ambient via an exhaust conduit 34. An EGR valve 36 is disposed in-line with an EGR conduit 38 fluidly coupled at one end to the intake conduit 20 and an opposite end to the exhaust conduit 32, and an EGR cooler 40 of known construction may optionally be disposed in-line with EGR conduit 38 between EGR valve 36 and intake conduit 20 as shown in phantom in FIG. 1.

System 10 includes a control computer 42 that is preferably microprocessor-based and is generally operable to control and manage the overall operation of engine 12. Control computer 42 includes a memory unit 45 as well as a number of inputs and outputs for interfacing with various sensors and systems coupled to engine 12. Control computer 42, in one embodiment, may be a known control unit sometimes referred to as an electronic or engine control module (ECM), electronic or engine control unit (ECU) or the like, or may alternatively be a control circuit capable of operation as will be described hereinafter. In any case, control computer 42 preferably includes one or more control algorithms, as will be described in greater detail hereinafter, for controlling an operating condition of engine 12.

Control computer 42 includes a number of inputs for receiving signals from various sensors or sensing systems associated with system 10. For example, system 10 includes an engine speed sensor 50 electrically connected to an engine speed input, ES, of control computer 42 via signal path 52. Engine speed sensor 50 is operable to sense rotational speed of the engine 12 and produce an engine speed signal on signal path 52 indicative of engine rotational speed. In one embodiment, sensor 50 is a Hall effect sensor operable to determine engine speed by sensing passage thereby of a number of equi-angularly spaced teeth formed on a gear or tone wheel. Alternatively, engine speed sensor 50 may be any other known sensor operable as just described including, but not limited to, a variable reluctance sensor or the like.

System 10 further includes an intake manifold pressure sensor 54 disposed in fluid communication with intake manifold 14 and electrically connected to an intake manifold pressure input, IMP, of control computer 42 via signal path 56. Alternatively, pressure sensor 52 may be disposed in fluid communication with intake conduit 20. In any case, pressure sensor 54 may be of known construction, and is operable to produce a pressure signal on signal path 56 indicative of the pressure within intake conduit 20 and intake manifold 14.

System 10 further includes an intake manifold temperature sensor 58 disposed in fluid communication with the intake manifold 14 of engine 12, and electrically connected to an intake manifold temperature input, IMT, of control computer 42 via signal path 60. Intake manifold temperature sensor 58 may be of known construction, and is operable to produce a temperature signal on signal path 60 indicative of the temperature of air charge flowing into the intake manifold 14, wherein the air charge flowing into the intake manifold 14 is generally made up of fresh air supplied by the turbocharger compressor 16 combined with recirculated exhaust gas supplied by EGR valve 36.

System 10 further includes a differential pressure sensor, or ΔP sensor, 62 fluidly coupled at one end to EGR conduit 38 adjacent to an exhaust gas inlet of EGR valve 36, and fluidly coupled at its opposite end to EGR conduit 38 adjacent to an exhaust gas outlet of EGR valve 36. Alternatively, the ΔP sensor 62 may be coupled across another flow restriction mechanism disposed in-line with EGR conduit 38. In either case, the ΔP sensor 62 may be of known construction and is electrically connected to a ΔP input of control computer 42 via signal path 64. The ΔP sensor 62 is operable to provide a differential pressure signal on signal path 64 indicative of the pressure differential across EGR valve 36 or other flow restriction mechanism disposed in-line with EGR conduit 38.

Optionally, as shown in phantom in FIG. 1, system 10 may include a mass flow sensor 66 disposed in fluid communication with intake manifold 14 and electrically connected to a charge mass flow rate input, CMF, of control computer 42 via signal path 68. Alternatively, mass flow sensor 66 may be disposed in fluid communication with intake conduit 20 downstream of the junction of intake conduit 20 with the EGR conduit 38. In any case, mass flow sensor 66 may be of known construction, and is operable to produce a mass flow signal on signal path 68 indicative of the mass flow rate of air charge entering intake manifold 14.

System 10 may further optionally include an engine exhaust temperature sensor 70 disposed in fluid communication with exhaust conduit 32 and electrically connected to an engine exhaust temperature input, EXT, of control computer 42 via signal path 72, as shown in phantom in FIG. 1. Alternatively, sensor 70 may be disposed in fluid communication with the exhaust manifold 30. In either case, temperature sensor 70 is operable to provide a temperature signal on signal path 72 indicative of the temperature of exhaust gas produced by engine 12.

System 10 may further optionally include an engine exhaust pressure sensor 74 disposed in fluid communication with exhaust conduit 32 and electrically connected to an engine exhaust pressure input, EXP, of control computer 42 via signal path 76, as shown in phantom in FIG. 1. Alternatively, sensor 74 may be disposed in fluid communication with the exhaust manifold 30. In either case, pressure sensor 74 is operable to provide a pressure signal on signal path 74 indicative of the pressure of engine exhaust gas within exhaust manifold 30 and exhaust conduit 32.

System 10 may further optionally include another mass flow sensor 78 disposed in fluid communication with EGR conduit 38 and electrically connected to an EGR mass flow rate input, EGRMF, of control computer 42 via signal path 80. Mass flow sensor 78 may be located anywhere along EGR conduit 38. In any case, mass flow sensor 78 may be of known construction, and is operable to produce a mass flow signal on signal path 80 indicative of the mass flow rate of exhaust gas flowing through EGR conduit 38.

Control computer 42 also includes a number of outputs for controlling one or more engine functions associated with system 10. For example, EGR valve 36 includes an EGR valve actuator 82 electrically connected to an EGR valve control output, EGRC, of control computer 42 via signal path 84. Control computer 42 is operable, as is known in the art, to produce an EGR valve control signal, EGRC, on signal path 84, and actuator 82 is responsive to the EGR valve control signal, EGRC, to control the position of EGR valve 36 relative to a reference position in a known manner. Control computer 42 is accordingly operable to control EGR valve 36 to selectively provide a flow of recirculated exhaust gas from exhaust manifold 30 to intake manifold 14. EGR valve 36 further includes an EGR position sensor 86 electrically connected to an EGR valve position input, EGRP, of control computer 42 via signal path 88. Sensor 86 may be of known construction and is operable to determine a position of EGR valve 36 by determining a position of EGR valve actuator 82 relative to a reference actuator position, and producing a position signal on signal path 88 indicative of the position of EGR valve 36 relative to a reference position.

System 10 further includes a fuel system 90 electrically connected to a fuel command output, FC, of control computer 42 via signal path 92. Fuel system 90 is responsive to fueling commands, FC, produced by control computer 42 on signal path 92 to supply fuel to engine 12 in a known manner.

Figure 2:
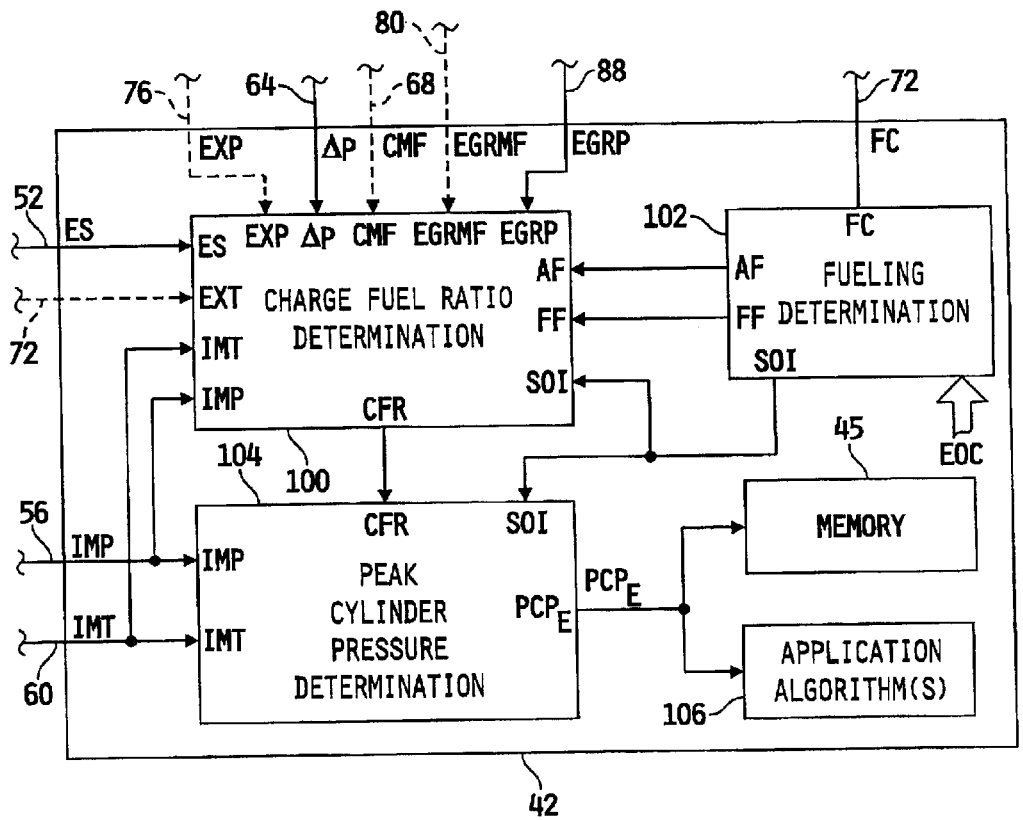
FIG. 2 is a block diagram illustrating one preferred configuration of the control computer of FIG. 1 for estimating peak cylinder pressure, in accordance with the present invention.

Referring now to FIG. 2, a block diagram is shown illustrating one preferred embodiment of a portion of the control computer 42 of FIG. 1, configured to estimate peak cylinder pressure in accordance with the present invention. Control computer 42 includes a fueling determination block 102 receiving as inputs a number of engine operating condition values, EOC, including, for example, engine speed and other engine operating parameters. Block 102 is responsive to the number of engine operating condition values, EOC, to determine a number of fueling parameters, including a mass fuel flow rate value, FF, a start-of-fuel injection timing value, SOI, and an air-to-fuel ratio value, AF, and to compute a fueling command, FC, as a function of these various fueling parameters, in a manner well known in the art. The fueling determination block 102 is operable to provide the fueling command, FC, on signal path 92, and the fueling system 90 is responsive to the fueling command, FC, to supply fuel to engine 12 in a known manner.

Control computer 42 further includes a charge fuel ratio determination block 100 receiving the start-of-injection, fuel flow and air-to-fuel ratio values, SOI, FF and AF respectively from fueling determination block 102, at inputs SOI, FF and AF respectively. In one embodiment, block 100 additionally receives as inputs the pressure differential signal, ΔP, on signal path 64, the intake manifold temperature signal, IMT, on signal path 60, the intake manifold pressure signal, IMP, on signal path 56, the EGR valve position signal, EGRP, on signal path 88 and the engine speed signal, ES, on signal path 52. Optionally, block 100 may receive as inputs any one or more of the engine exhaust temperature signal, EXT, on signal path 72, the engine exhaust pressure signal, EP, on signal path 76, the charge mass flow signal, CMF, on signal path 68 and the EGR mass flow signal, EGRMF, on signal path 80. Block 100 is operable, as will be described subsequently, to estimate, as a function of various combinations of the input values and/or signals to block 100, a charge fuel ratio value, CFR, corresponding to a function of the air-to-fuel ratio, AF, and a burned gas fraction, $X_b$.

Control computer 42 further includes a peak cylinder pressure determination block 104 receiving as inputs the intake manifold pressure value, IMP, the intake manifold temperature value, IMT, the start-of-injection value, SOI, produced by the fueling determination block 102, and the charge fuel ratio value, CFR, produced by block 100. The peak cylinder pressure determination block 104 is operable, in a manner to be fully described hereinafter, to process the various input signals to block 104 and determine as a function thereof an estimate of the peak cylinder pressure, $PCP_E$. In one embodiment, the peak cylinder pressure determination block 104 is operable to store, in some form, the estimated peak cylinder pressure value, $PCP_E$, in memory unit 45. In one implementation, for example, memory unit 45 includes a buffer of predefined sample length, N, that is operable to store therein the most recent N samples, wherein N may be any positive integer. In this case, an average peak cylinder pressure estimate may be represented as a running average of the peak cylinder pressure estimate samples, $PCP_E$, contained in the buffer. Those skilled in the art will recognize other known strategies of varying complexity for storing $PCP_E$ values, and/or for computing effective, average or running average $PCP_E$ values, and any such strategies are intended to fall within the scope of the present invention. Alternatively or additionally, the peak cylinder pressure determination block 104 may provide the peak cylinder pressure estimate values, $PCP_E$, to one or more application algorithms 106 resident within control computer 42 or other signal processing circuit. An example of one such application algorithm 106 making use of the peak cylinder pressure estimate, $PCP_E$, is described in co-pending U.S. patent application Ser. No. 10/103,427, entitled SYSTEM FOR CONTROLLING AN OPERATING CONDITION OF AN INTERNAL COMBUSTION ENGINE, which is assigned to the assignee of the present invention, and the disclosure of which is incorporated herein by reference.

In the embodiment illustrated in FIG. 2, the charge fuel ratio determination block 100 is operable to determine the charge fuel ratio value, CFR, as a function of the air-to-fuel ratio value, AF, and a burned gas fraction value, $X_b$, wherein the burned gas fraction value, $X_b$, is defined as the sum of an EGR fraction, EGRFR, corresponding to the fraction of recirculated exhaust gas present in the charge supplied to the intake manifold 14, and a residual mass fraction value, RMF, corresponding to a mass fraction of residual gases trapped within the cylinders of the engine 12. The charge fuel ratio determination block 100 is operable, in the embodiment shown, to compute the charge fuel ratio value, CFR, according to the equation:

$$CFR = AF/[1-(EGRFR+RMF)] \qquad (1).$$

The air-to-fuel ratio value, AF, is supplied to block 100 by the fueling determination block 102, and the EGR fraction value, EGRFR, and the residual mass fraction value, RMF, are each computed by block 100 as a function of one or more of the input values and/or signals to block 100.

In one embodiment, the charge fuel ratio determination block 100 is operable to compute the EGR fraction value, EGRFR, as a function of a charge flow value, CF, corresponding to the mass flow rate of charge supplied to the intake manifold 14 and an EGR flow value, EGRF, corresponding to the mass flow rate of exhaust gas flowing through EGR conduit 38. In this embodiment, the charge flow determination block 110 may be operable to compute an estimate of the charge flow value, CF, as will be described subsequently, or may instead obtain the charge flow information, CF, directly from optional mass flow sensor 66 producing the charge mass flow rate signal CMF. In embodiments wherein block 100 is operable to compute an estimate of charge flow value, CF, block 100 is first operable to estimate the volumetric efficiency ($\eta_V$) of the charge intake system, and then compute CF as a function of $\eta_V$ using a conventional speed/density equation. Any known technique for estimating $\eta_V$ may be used, and in one preferred embodiment of block 100, $\eta_V$ is computed according to a known Taylor mach number-based volumetric efficiency equation given as:

$$\eta_V = A_1 * \{(Bore/D)^2 * (stroke*ES)^B / sqrt(\gamma*R*IMT) * [(1+EP/IMP) + A_2]\} + A_3 \qquad (2),$$

where, $A_1, A_2, A_3$ and B are all calibratable parameters preferably fit to the volumetric efficiency equation based on mapped engine data, Bore is the intake valve bore length, D is the intake valve diameter, stroke is the piston stroke length, wherein Bore, D and stroke are dependent upon engine geometry, γ and R are known constants (e.g., γ*R=387.414 J/kg/deg K.), ES is engine speed, IMP is the intake manifold pressure, EP is the exhaust pressure, where EP=IMP+ΔP, or EP is provided by optional engine exhaust pressure sensor 74 producing the engine exhaust pressure signal EXP, and IMT=intake manifold temperature.

With the volumetric efficiency value $\eta_V$ estimated according to the foregoing equation, block 100 is operable to compute the charge flow value, CF, according to the equation:

$$CF = \eta_V * V_{DIS} * ES * IMP / (2 * R * IMT) \quad (3),$$

where, $\eta_V$ is the estimated volumetric efficiency, $V_{DIS}$ is engine displacement and is generally dependent upon engine geometry, ES is engine speed, IMP is the intake manifold pressure, R is a known gas constant (e.g., R=53.3 ft-lbf/lbm ° R or R=287 J/Kg ° K.), and IMT is the intake manifold temperature.

In the present embodiment of the charge fuel ratio determination block 100 being described, block 110 may be operable to compute an estimate of the EGR flow value, EGRF, as will be described subsequently, or may instead obtain the EGR flow information, EGRF, directly from optional mass flow sensor 78 producing the EGR mass flow rate signal EGRMF. In embodiments wherein block 100 is operable to compute an estimate of the EGR flow value, EGRF, block 100 is preferably operable to estimate EGRF as a function of the pressure differential value, ΔP, the intake manifold pressure, IMP, engine exhaust temperature, $T_{EX}$ and an effective flow area, EFA, corresponding to the cross-sectional flow area defined through EGR conduit 38.

In one embodiment, block 100 may be operable to obtain the engine exhaust temperature information directly from optional sensor 70 producing the engine exhaust temperature signal, EXT, or may instead compute an estimate of the engine exhaust temperature value, $T_{EX}$, as a function of some of the input values/signals to block 100. In one embodiment, for example, block 100 may be operable to compute an estimate of the engine exhaust temperature, $T_{EX}$, according to the equation:

$$T_{EX} = IMT + [(A*ES) + (B*IMP) + (C*SOI) + D)][(LHV*FF)/CF] \quad (4),$$

where,

IMT is the intake manifold temperature,

ES is the engine speed,

IMP is the intake manifold pressure,

SOI is the start of injection value produced by fueling determination block 102, FF is the fuel flow value produced by fueling determination block 102, CF is the charge mass flow rate, LHV is a lower heating value of the fuel which is a known constant depending upon the type of fuel used by engine 12, and A, B, C, and D are model constants.

In an alternate embodiment, block 100 may be operable to compute the engine exhaust temperature estimate, $T_{EX}$, according to the equation:

$$T_{EX} = IMT + A + (B*SOI) + C/(CF/FF) + (D*SOI)/ES + E/[(ES*CF)/FF] \quad (5),$$

where,

IMT is the intake manifold temperature,

ES is the engine speed,

SOI is the start of injection value produced by fueling determination block 102, FF is the fuel flow value produced by fueling determination block 102, CF is the charge mass flow rate, and A, B, C, and D are model constants.

Further details relating to either of the engine exhaust temperature models represented by equations (4) and (5) are provided in co-pending U.S. patent application Ser. No. 09/774,664, entitled SYSTEM FOR ESTIMATING ENGINE EXHAUST TEMPERATURE, which is assigned to the assignee of the present invention, and the disclosure of which is incorporated herein by reference.

In the embodiment illustrated in FIGS. 1 and 2, the charge fuel ratio determination block 100 is operable to compute the effective flow area value, EFA, as a function of the EGR valve position signal, EGRP. In such embodiments, block 110 may include one or more equations, graphs and/or tables relating EGR position values, EGRP, to effective flow area values, EFA. In embodiments wherein the charge fuel ratio determination block 100 is operable to estimate the EGR flow value, EGRF, block 100 may be configured to estimate EGRF according to the equation:

$$EGRF = EFA * sqrt[|(2*\Delta P*IMP)/(R*T_{EX})|] \quad (6),$$

where,

EFA is the effective flow area through EGR conduit 38,

ΔP is the pressure differential across EGR valve 36,

IMP is the intake manifold pressure,

R is a known gas constant (e.g., R=53.3 ft-lbf/lbm ° R or R=287 J/Kg K.), and $T_{EX}$ is the engine exhaust gas temperature.

With the charge flow value, CF, and EGR flow value, EGRF, determined, the charge fuel ratio determination is operable in the embodiment being described to compute the EGR fraction value, EGRFR, as a ratio of CF and EGRF; i.e., EGRFR=CF/EGRF. It is to be understood that equation (6), as well as the computation of the EGR fraction value, EGRFR, just described represent simplified approximations of these two parameters based on assumptions of constant exhaust gas temperature through the EGR valve 36 and steady state flow of exhaust gas through EGR valve 36, and neglecting effects resulting from variable time delays between the passage of recirculated exhaust gas through EGR valve 36 and arrival of the corresponding EGR fraction in the engine cylinders. Further details relating to strategies for addressing such assumptions are described in co-pending U.S. patent application Ser. No. 09/774,897, entitled SYSTEM AND METHOD FOR ESTIMATING EGR MASS FLOW AND EGR FRACTION, which is assigned to the assignee of the present invention, and the disclosure of which is incorporated herein by reference.

Those skilled in the art will recognize that, for purposes of the present invention, other known techniques may be used to determine the EGR fraction value, EGRFR. For example, system 10 may include a CO or $CO_2$ sensor of known construction and fluidly coupled to intake manifold 14 or intake conduit 20 downstream of the junction of intake conduit 20 with the EGR conduit 36. Such a CO or $CO_2$ sensor will be operable to produce a signal indicative of CO or $CO_2$ level of air charge entering the intake manifold 14, and such information may be used to determine the EGR fraction value, EGRFR, using known equations.

The charge fuel ratio determination block 100 is further operable to determine the residual mass fraction value, RMF, and in one embodiment, block 100 is operable to compute RMF according to the equation:

$$RMF = (MDC * EP) / T_{EX}(° R) \quad (7),$$

where,

MDC is a mass density constant,

EP is the engine exhaust pressure: EP=ΔP+IMP, or EP is provided by optional engine exhaust pressure sensor 74 producing the engine exhaust pressure signal EXP, and $T_{EX}$ is the engine exhaust temperature, wherein $T_{EX}$ is estimated as described above, or is provided by the optional sensor 70 producing the engine exhaust temperature signal EXT.

Generally, the mass density constant, MDC, is a function of engine geometry, and may be given by the equation:

$$MDC = (DIS * K1)/[(CR-1) * R * K2 * NCYL] \qquad (8),$$

where,
DIS is cylinder displacement (in³),
K1 is a constant (453,600 mg/lbm),
CR is the cylinder compression ratio,
R is a known gas constant (e.g., R=53.3 ft-lbf/lbm ° R or R=287 J/Kg ° K.),
K2 is a conversion constant (12 in/ft), and
NCYL is the number of cylinders in the engine.

In the embodiment of the charge fuel ratio determination block 100 illustrated in FIG. 2, block 100 is operable to compute EGRFR and RMF as described hereinabove, and to compute CFR according to equation (1). Those skilled in the art will recognize that any one or more of the engine operating parameter estimation algorithms described hereinabove may be replaced by one or more other known estimation algorithms, and/or that any one or more engine parameter signals used in any such calculations may be replaced by an estimated value therefore, and any such known estimation algorithms are intended to fall within the scope of the present invention. Additionally, it is to be understood that the embodiment illustrated in FIGS. 1 and 2 for determining the charge fuel ratio value, CFR, is provided only by way of example, and that any known technique for determining CFR is intended to fall within the scope of the present invention.

Figure 3:
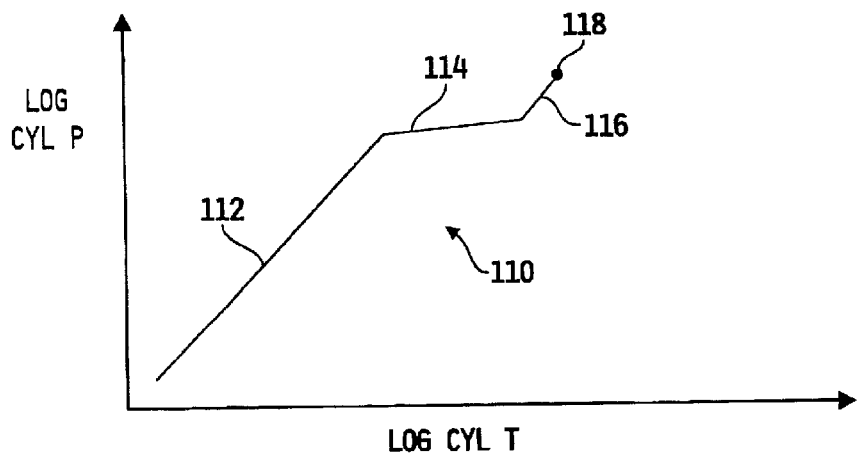
FIG. 3 is a plot of cylinder pressure vs. cylinder temperature illustrating some of the concepts of the present invention for estimating peak cylinder pressure.
Figure 4:
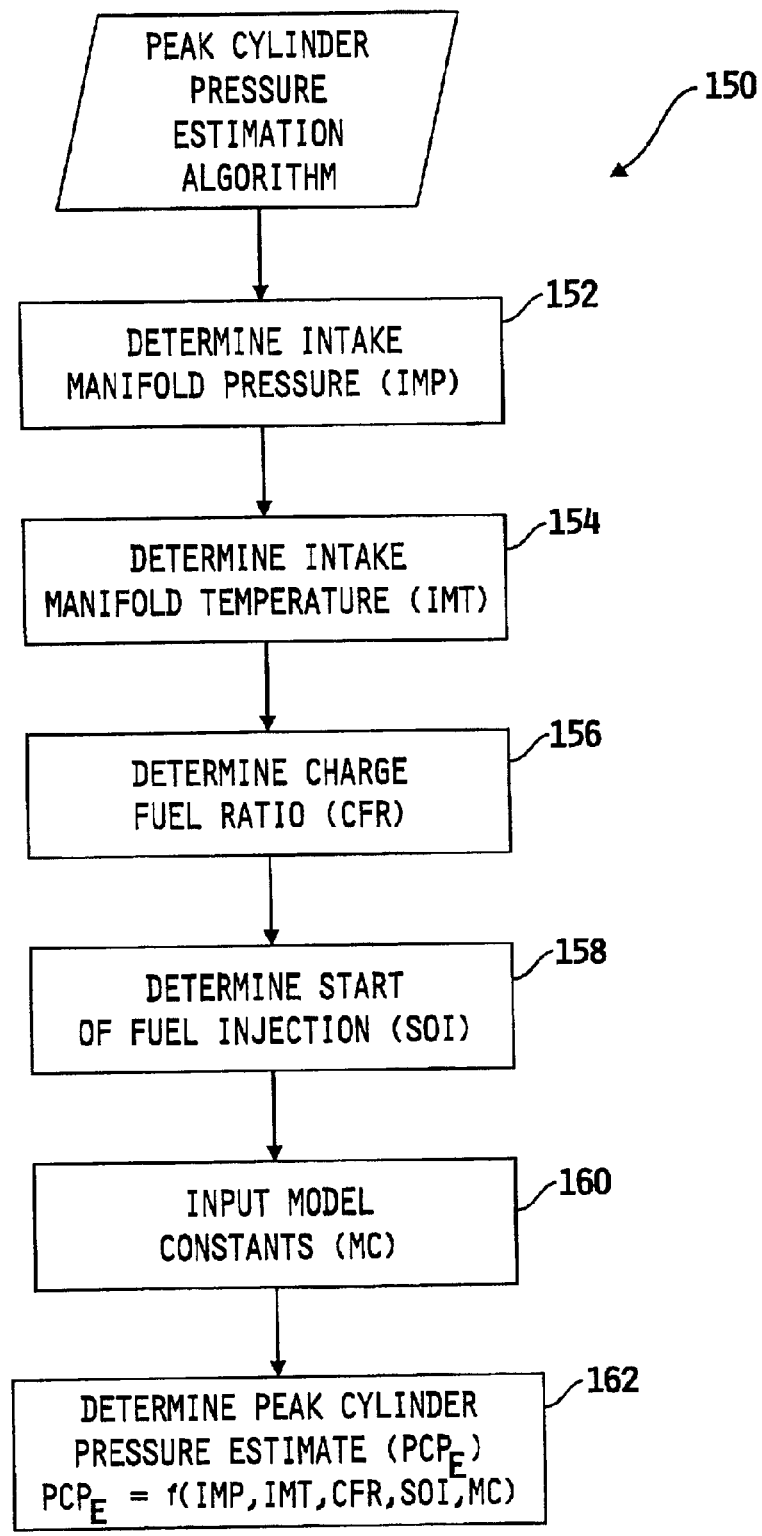
FIG. 4 is a flowchart illustrating one preferred embodiment of a software algorithm for estimating peak cylinder pressure in an internal combustion engine, in accordance with the present invention.

In accordance with the present invention, peak cylinder pressure in an internal combustion engine is modeled as the result of three idealized processes, wherein these three processes are illustrated graphically in FIG. 3 as line segments 112, 114 and 116. Referring to FIG. 3, a plot 110 of the log of cylinder pressure vs. the log of cylinder temperature is shown illustrating three connected line segments, 112, 114 and 116 that terminate at a peak cylinder pressure point 118. Line segment 112 represents the first idealized process, identified as isentropic compression resulting from piston motion from intake valve closing (IVC) to start-of-injection (SOI). The second idealized process, represented by line segment 114, is a constant volume heat release at start-of-injection (SOI) resulting from the burning of some of the trapped fuel (the remaining fuel is assumed to be burned at a substantially constant pressure). The third idealized process, terminating at the peak cylinder pressure point 118, is isentropic compression after constant volume heat release resulting from piston motion, and is represented by line segment 116. In accordance with the present invention, models have been developed to describe the behavior of each of the segments 112, 114 and 116, in terms of one or more of the input values and/or signals to the peak cylinder pressure determination block 104. The various models for each of these segments, 112, 114 and 116 are then combined to form an overall expression defining the peak cylinder pressure estimate, $PCP_E$, in terms of the input values and/or signals IMT, IMP, CFR (function of A/F, EGRFR and RMF) and SOI, and this expression is stored within the peak cylinder pressure determination block 104. An algorithm resident within block 100, one embodiment of which will be described in detail hereinafter with respect to FIG. 4, is operable to continually compute the peak cylinder pressure estimate, $PCP_E$, according to the peak cylinder pressure expression stored therein.

With respect to segment 112 of the plot of FIG. 3, isentropic compression resulting from piston motion from IVC to SOI may be evaluated by considering a ratio of cylinder volumes at IVC and SOI, and for one specific engine configuration, this ratio may be represented as:

$$(V_{IVC}/V_{SOI})^{\gamma} \qquad (9),$$

and $$(V_{IVC}/V_{SOI})^{\gamma-1} \qquad (10),$$

where,
$V_{IVC}$ represents the cylinder volume at intake valve closing (IVC),
$V_{SOI}$ represents the cylinder volume at start-of-injection (SOI), and
$\gamma$ is an isentropic compression constant, which is approximately equal to the ratio of specific heats. In heavy duty diesel engines, $\gamma$ is approximately 1.35, although this value may vary for other engine types and sizes.

It will be understood that equations (9) and (10) represent cylinder volume ratios for one specific engine configuration, and that the form of equations (9) and (10) for other engine configurations may be easily determined by a skilled artisan taking into account appropriate bore diameters, stroke lengths and compression ratios.

In accordance with the present invention, equations (9) and (10) may be approximated as second-order functions of SOI, wherein SOI is the engine crank angle at the start of fuel injection (typically measured in degrees after top-dead-center (TDC)). Cylinder pressure at SOI, $P_{SOI}$, may then be estimated as a product of equation (9) and the intake manifold pressure value, IMP, and cylinder temperature at SOI, $T_{SOI}$, may be estimated as a product of equation (10) and a sum of the intake manifold temperature value, IMT, and a reheat value, RH. These estimations may be represented by the following equations:

$$P_{SOI} = IMP*(A*SOI^2 + B*SOI + C) \qquad (11),$$

and $$T_{SOI} = (IMT + RH)*(D*SOI^2 + E*SOI + F) \qquad (12),$$

where,
IMP is the intake manifold pressure,
SOI is the start-of-injection in degrees after top-dead-center (TDC),
IMT is the intake manifold temperature,
RH is a reheat value, and
A, B, C, D, E and F are model constants.

In one embodiment, the reheat value, RH, is set at a constant value (e.g., 60° F. or 33.3° K.), although the present invention contemplates modeling RH as a function of engine geometry and/or one or more engine operating parameters.

With respect to segment 114 of the plot of FIG. 3, the fraction, f, of fuel energy released at constant volume is modeled as a linear function of IMT. In one embodiment, f=a*IMT+b, wherein "a" and "b" are model constants, and IMT is the intake manifold temperature in ° K. In an alternate embodiment, the accuracy of the fraction, f, of fuel energy may be enhanced by modeling "f" as a function of other engine operating parameters such as IMT, EGRFR, ES and $T_{SOI}$. In accordance with the present invention, the cylinder temperature after constant volume combustion, $T_{CVC}$, is modeled according to the equation:

$$T_{CVC} = T_{SOI} + (f*LHV)/(C_V*CFR) \qquad (13),$$

where, $T_{SOI}$ is the cylinder temperature at SOI, represented by equation (12), "f" is the fraction of fuel energy released at constant volume, LHV is the lower heating value of fuel, and depends upon the type of fuel used (e.g., 42,500 KJ/kg for diesel fuel), $C_V$ is the specific heat capacity at constant volume (e.g., 0.7 KJ/kg-° K.), and CFR is the charge fuel ratio value produced by block 100 of FIG. 2.

In accordance with the present invention, the cylinder pressure after constant volume combustion, $P_{CVC}$, is then modeled according to the equation:

$$P_{CVC} = P_{SOI} * (T_{CVC}/T_{SOI}) \qquad (14).$$

Substituting equations (11), (12) and (13) into equation (14), yields the equation:

$$P_{CVC} = IMP*(A*SOI^2 + B*SOI + C) + [IMP*LHV*(a*IMT + b)*(A*SOI^2 + B*SOI + C)]/[C_V*CFR*(IMT+RH)*(D*SOI^2 + E*SOI+F)] \qquad (15).$$

With respect to segment 116 of the plot of FIG. 3, the charge within the engine cylinders can be further compressed, after constant volume heat release, which could increase or decrease cylinder pressure. In accordance with the present invention, the charge is presumed to be isentropically compressed, after constant volume heat release, from the volume at SOI to the volume at TDC. The resulting peak cylinder pressure estimate, $PCP_E$, is modeled according to the equation:

$$PCP_E = P_{CVC}*(A'*SOI^2 + B'*SOI + C') \qquad (16),$$

where, $P_{CVC}$ is the cylinder pressure after constant volume combustion, and is represented by equation (15), SOI is the start of fuel injection, and A', B' and C' are model constants.

Substituting equation (15) into equation (16), the peak cylinder pressure estimate, $PCP_E$, can be expressed as a function of the variable values IMP, SOI, IMT and CFR according to the equation:

$$PCP_E = IMP*(A*SOI^2+B*SOI+C)*(A'*SOI^2+B'*SOI+C') + [IMP*LHV*(a*IMT+b)*(A*SOI^2+B*SOI+C)*(A'*SOI^2+B'*SOI+C')]/[C_V*CFR*(IMT+RH)*(D*SOI^2+E*SOI+F)] \qquad (17).$$

In accordance with the present invention, equation (17) is stored within the peak cylinder pressure determination block 104 of FIG. 2, and control computer 42 is operable to execute a software algorithm operable to compute the peak cylinder pressure estimate, $PCP_E$, based on equation (17). It is to be understood that equation (17) represents a peak cylinder pressure estimate for one specific engine configuration, although a skilled artisan could adapt equation (17) to other engine configurations as indicated hereinabove. Such an adaptation would be a mechanical step for a skilled artisan.

Referring now to FIG. 4, a flowchart is shown illustrating one preferred embodiment of a software algorithm 150 for computing the peak cylinder pressure estimate, $PCP_E$, in accordance with the present invention. Algorithm 150 is executed by control computer 42, and begins at step 152 where control computer 42 is operable to determine the intake manifold pressure, IMP, using any one or more of the techniques described hereinabove. Thereafter at step 154, control computer 42 is operable to determine the intake manifold temperature, IMT, also using any one or more of the techniques described hereinabove. Thereafter at step 156, control computer is operable to determine the charge fuel ratio value, CFR, using any one or more of the techniques described hereinabove. Thereafter at step 158, control computer 42 is operable to determine the start-of-injection value, SOI, as described hereinabove. Following step 158, control computer 42 is operable at step 160 to determine the various $PCP_E$ model constants, MC, by recalling from memory equation (17). Thereafter at step 162, control computer 42 is operable to determine the peak cylinder pressure estimate, $PCP_E$, as a function of IMP, IMT, CFR, SOI and MC by solving equation (17).

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. System for estimating peak cylinder pressure in an internal combustion engine, comprising:

a pressure sensor producing a pressure signal indicative of pressure within an intake manifold of the engine;

a temperature sensor producing a temperature signal indicative of temperature within said intake manifold;

means for determining a charge fuel ratio corresponding to a ratio of in-cylinder trapped charge mass and in-cylinder trapped fuel mass; and a control computer determining a start-of-injection value corresponding to a timing of start of fuel injection into the engine, said control computer estimating peak cylinder pressure as a function of said pressure signal, said temperature signal, said charge fuel ratio and said start-of-injection value.

2. The system of claim 1 further including a fuel system responsive to a fueling signal to supply fuel to the engine; and wherein said control computer is operable to produce said fueling signal as a function of said start-of-injection value.

3. The system of claim 1 wherein said control computer includes:

means for determining a cylinder pressure at start-of-injection ($P_{SOI}$) as a function of said pressure signal and said start-of-injection value;

means for determining a cylinder temperature at start-of-injection ($T_{SOI}$) as a function of said temperature signal and said start-of-injection value;

means for determining a cylinder temperature at an end of constant volume combustion ($T_{CVC}$) as a function of said temperature signal, said $T_{SOI}$, and said charge fuel ratio;

means for determining a cylinder pressure at an end of constant volume combustion ($P_{CVC}$) as a function said $P_{SOI}$, said $T_{SOI}$ and said $T_{CVC}$; and means for determining said peak cylinder pressure as a function of said $P_{CVC}$ and said start-of-injection value.

4. The system of claim 3 wherein said means for determining a cylinder pressure at start of injection ($P_{SOI}$) includes means for determining $P_{SOI}$ according to the function:

$$P_{SOI} = P*(A*SOI^2 + B*SOI + C),$$

wherein P is the pressure signal, SOI is the start-of-injection value, and A, B and C are constants.

5. The system of claim 4 wherein said means for determining a cylinder temperature at start-of-injection ($T_{SOI}$) includes means for determining $T_{SOI}$ according to the function:

$$T_{SOI}=(T+R)*(D*SOI^2+E*SOI+F),$$

wherein T is the temperature signal, R is a reheat value, and D, E and F are constants.

6. The system of claim 5 wherein said means for determining a cylinder temperature at an end of constant volume combustion ($T_{CVC}$) includes means for determining $T_{CVC}$ according to the function:

$$T_{CVC}=T_{SOI}+[LHV*(G*T+H)]/(C_V*CFR),$$

wherein LHV is a lower heating value of the fuel, $C_V$ is specific heat capacity at a constant volume, CFR is the charge fuel ratio, and G and H are constants.

7. The system of claim 6 wherein said means for determining a cylinder pressure at an end of constant volume combustion ($P_{CVC}$) includes means for determining $P_{CVC}$ according to the function:

$$P_{CVC}=P_{SOI}*(T_{CVC}/T_{SOI}).$$

8. The system of claim 7 wherein said means for determining said peak cylinder pressure includes means for determining said peak cylinder pressure according to the function:

$$PCP=P_{CVC}*(I*SOI^2+J*SOI+K),$$

wherein PCP is said peak cylinder pressure, and I, J and K are constants.

9. A method of estimating peak cylinder pressure in an internal combustion engine, the method comprising the steps of:
  determining a pressure value indicative of pressure within an intake manifold of the engine;
  determining a temperature value indicative of temperature within said intake manifold;
  determining a charge fuel ratio corresponding to a ratio of in-cylinder trapped charge mass and in-cylinder trapped fuel mass;
  determining a start-of-injection value corresponding to a timing of start of fuel injection into the engine; and
  estimating peak cylinder pressure as a function of said pressure value, said temperature value, said charge fuel ratio and said start-of-injection value.

10. The method of claim 9 further including the step of determining a cylinder pressure at start of injection ($P_{SOI}$) according to the function:

$$P_{SOI}=P*(A*SOI^2+B*SOI+C),$$

wherein P is the pressure value, SOI is the start-of-injection value, and A, B and C are constants.

11. The method of claim 10 further including the step of determining a cylinder temperature at start-of-injection ($T_{SOI}$) according to the function:

$$T_{SOI}=(T+R)*(D*SOI^2+E*SOI+F),$$

wherein T is the temperature signal, R is a reheat value, and D, E and F are constants.

12. The method of claim 11 further including the step of determining a cylinder temperature at an end of constant volume combustion ($T_{CVC}$) according to the function:

$$T_{CVC}=T_{SOI}+[LHV*(G*T+H)]/(C_V*CFR),$$

wherein LHV is a lower heating value of the fuel, $C_V$ is specific heat capacity at a constant volume, CFR is the charge fuel ratio, and G and H are constants.

13. The method of claim 12 further including the step of determining a cylinder pressure at an end of constant volume combustion ($P_{CVC}$) according to the function:

$$P_{CVC}=P_{SOI}*(T_{CVC}/T_{SOI}).$$

14. The system of claim 13 wherein the estimating step includes estimating said peak cylinder pressure according to the function:

$$PCP=P_{CVC}*(I*SOI^2+J*SOI+K),$$

wherein PCP is said peak cylinder pressure, and I, J and K are constants.

* * * * *